United States Patent [19]

Smart

[11] 4,299,877
[45] Nov. 10, 1981

[54] CLADDING AND METHOD OF MAKING SAME

[75] Inventor: Deane W. Smart, Auckland, New Zealand

[73] Assignee: Fletcher Wood Panels Limited, Auckland, New Zealand

[21] Appl. No.: 87,100

[22] Filed: Oct. 22, 1979

[30] Foreign Application Priority Data

Oct. 24, 1978 [NZ] New Zealand .................. 188719

[51] Int. Cl.³ .................. B32B 5/16; B32B 31/20
[52] U.S. Cl. .................. 428/212; 156/62.2;
156/228; 156/327; 156/403; 264/112; 264/319;
428/326; 428/332; 428/528; 428/921
[58] Field of Search .............. 428/326, 332, 402, 528,
428/403, 212, 921; 156/62.2, 62.8, 228, 327;
264/112, 113, 128, 319

[56] References Cited

U.S. PATENT DOCUMENTS

| | | | |
|---|---|---|---|
| 2,686,143 | 8/1954 | Fahrni | 428/146 |
| 2,851,730 | 9/1958 | Wilhelmi et al. | 428/326 |
| 3,880,975 | 4/1975 | Lundmark | 156/62.2 |
| 3,988,183 | 10/1976 | Senn | 156/62.8 |
| 4,163,820 | 8/1979 | Corver et al. | 428/326 |

*Primary Examiner*—Paul J. Thibodeau
*Attorney, Agent, or Firm*—Holman & Stern

[57] ABSTRACT

A method of manufacturing cladding which comprises the steps of making cellulosic material in the form of particles in which about 20 to 30% of the particles comprise fine particles and the remaining percentage comprise coarse particles which have a thickness of 0.35 to 0.7 mm. A bonding resin is then added to the cellulosic material and the cellulosic material is then formed into a mat. The mat is then passed to a hot press and the press is operated in a manner to obtain rapid closure from the initial contacting of the press platens with the mat until the cladding material so formed is of required thickness. The coarse particles form a core between two layers of fine particles and the core has a void content of between 10 and 30% preferably about 25%.

14 Claims, 3 Drawing Figures

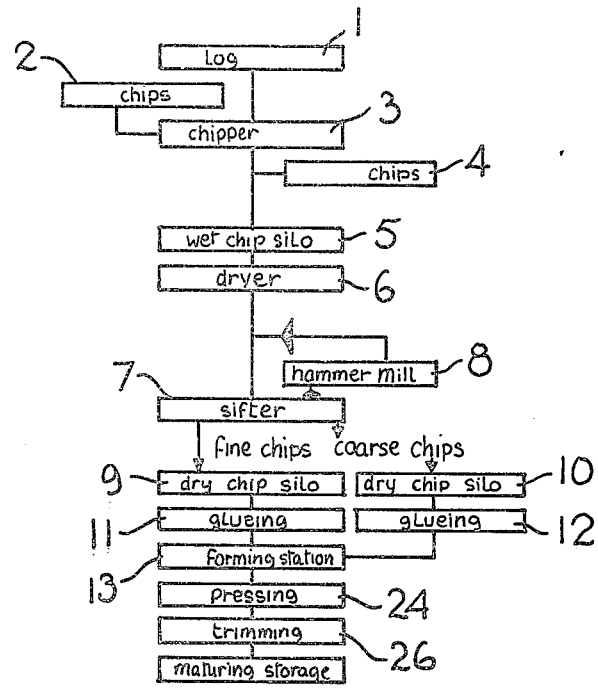
FIG. 1
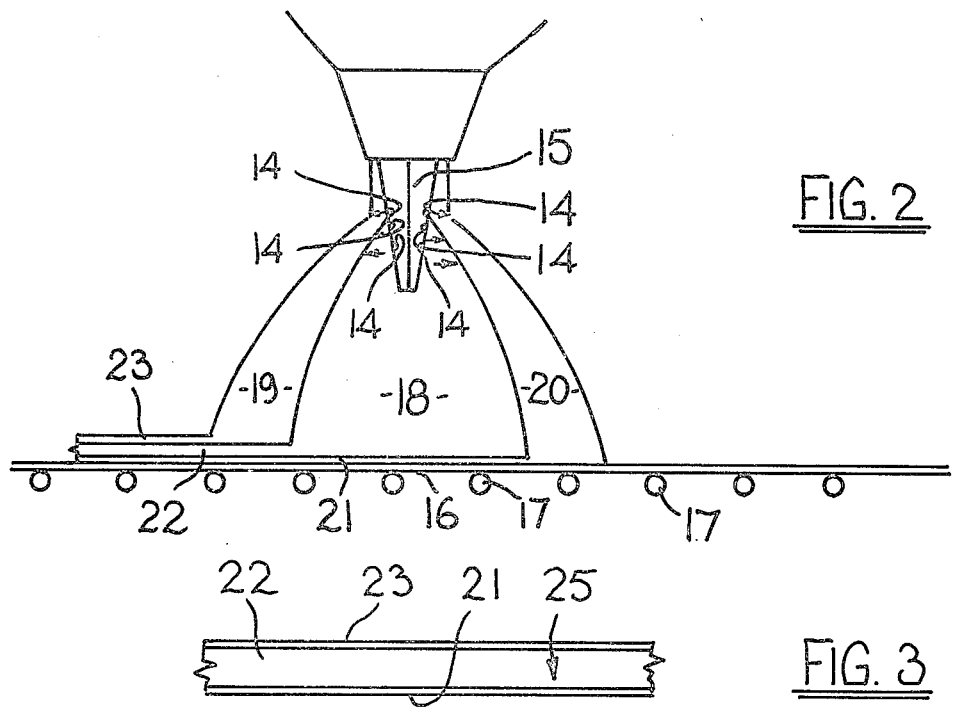
FIG. 2
FIG. 3

CLADDING AND METHOD OF MAKING SAME

BACKGROUND OF THE INVENTION

1. Field of the Invention

This invention relates to cladding and/or methods of making the same and has been devised particularly though not solely as a wall board for interior cladding.

2. Description of the Prior Art

Partitioning is often formed by mounting cladding panels on a frame work. Such partitioning may be used for example in offices or may in fact be used in homes and similar methods may be used to form, for example, ceilings to rooms. Particle board is sometimes used as the base material for the cladding and this may be used either as the particle board itself or may have a veneer coating placed thereover. Particle board for use as cladding at present has difficulties in that such particle board is relatively expensive and thus is at a cost disadvantage when compared to other commonly used products such as, for example, plaster board.

SUMMARY OF THE INVENTION

It is an object of the present invention to provide a cladding and/or a method of making the same which will at least provide the public with a useful choice.

Accordingly, in one aspect the invention consists in a method of manufacturing cladding, said method comprising the steps of making cellulosic material in the form of particles, in which about 20 to 30% of the particles comprise fine particles, the remaining percentage comprising coarse particles having a thickness of 0.35 to 0.7 mm, adding a bonding resin to the cellulosic material, forming the cellulosic material into a mat, passing that mat to a hot press in a manner such that said coarse particles form a core between two layers of said fine particles, operating the press in a manner such as to obtain rapid closure from the initial contacting of the press platens with the mat until the cladding material so formed is of the required thickness but having between 10% and 30% of said core void, maintaining the press pressure and temperature at temperatures of the order of 180° to 240° C., maintaining the pressure and temperature for a sufficient time to cure the cladding and removing the wall board from the press.

Another embodiment the invention consists in a cladding comprising cellulosic material in the form of particles of which about 20–30% of the particles comprise fine particles and the remaining percentage comprise coarse particles having a thickness of 0.35 to 0.7 mm which coarse particles form a core between two layers of fine particles, said particles being bonded by a bonding resin and the cladding being formed by the layers being pressed in a hot press at a temperature between 180° and 240° C. and the pressing pressures being arranged so that the wall board is pressed to its final thickness within 10 to 25 seconds and such that said core has a void content between 10 and 30% of the volume thereof.

To those skilled in the art to which this invention relates, many changes in construction and widely differing embodiments and applications of the invention will suggest themselves without departing from the scope of the invention as defined in the appended claims. The disclosures and the description herein are purely illustrative and are not intended to be in any sense limiting.

BRIEF DESCRIPTION OF THE DRAWINGS

One preferred form of the invention and modifications thereof will now be described with reference to the accompanying drawings in which, FIG. 1 is a schematic flow diagram of a particle board manufacturing process, FIG. 2 is a diagrammatic representation of an air flow separation means for use in the invention, and FIG. 3 is a cross sectional diagrammatic representation of a cladding panel according to the invention.

DESCRIPTION OF THE PREFERRED EMBODIMENTS

In the preferred form of the invention a cladding is manufactured as follows.

The cladding is made from cellulosic material in the form of particles. The raw material comprises wood particles of two types, coarse particles and fine particles. The particles may be formed from log slabs 1 or chips 2 passed through a chipper or hogger 3. Chips 4 from an external source may also be used. Such chips should in general be larger than the chip size finally required. Such chips pass through a wet chip silo 5 and dryer 6. From the dryer 6 the chips pass to a sift 7 and cycle from the sifter 7 to a hammer mill 8. The fine particles and coarse particles are sifted out and pass to a suitable fine chip silo 9 and coarse chip silo 10. The coarse particles are of a thickness lying between 0.35 mm and 0.7 mm and of lengths capable of being achieved with this thickness of material, having regard to the handling that the particles are subjected to during the manufacturing process.

The fine particles are of a size about which will pass through a 0.5 mm mesh and these particles are mixed in a proportion of between 20% fine and 80% coarse and 30% fine to 70% coarse, the preferred mixture being about 25% fine to 75% coarse. The moisture content of the particles is kept around 1%–2% by weight.

These particles are coated with a bonding resin at gluing stations 11 and 12 selected from urea formaldehyde, melamine fortified urea formaldehyde, phenol urea formaldehyde, tannin formaldehyde and bonding agents incorporating isosyanates. Preferably the urea formaldehyde is used since it has reasonable cost and provides adequate bonding for the service for which the cladding is to be used which is principally as an interior cladding in buildings. Preferably about 3% to 8% but preferably 5% of bonding resin is added by weight to the particle mixture.

It is to be noted that a higher percentage of bonding resin is added to the fine particles of material and a lesser amount added to the coarse particles but the average amount of bonding agent is 5% by weight.

After mixing with the bonding resin and while the resin is still uncured the coarse and fine chips are combined together and the mixture is moved to a forming station 13 at which the chips are caused to flow downwardly past an air separation means in which blasts of air e.g. from apertures 14 in nozzle 15 are arranged to pass transversely to the direction of flow of the particles. Below the air separation means there is provided a conveyor belt 16 comprising a thin wide endless belt of, for example, steel or stainless steel, running around or on rollers 17 and/or sliding over surfaces and the belt travels substantially parallel to the air flows in the air separation means. The result of this is that the air separation means causes the particles to be divided into three flows central core 18 comprising principally the coarse particles and on either side of the central core flows 19 and 20 of fine material. Thus flow 20 of fine material falls on the travelling belt to form layer 21 and is then covered with a layer 22 comprising the coarse material forming the core of the cladding material being formed and the core is then coated with a further layer 23 of fines.

The belt passes through a single daylight hot press 24 the operating temperatures of which lie between 180 and 240° C. preferably at about 220° C. The press 24 is arranged so that the rate of closing of the opening in the press, down to stops which define the thickness of the cladding being manufactured, is rapid and lies between 10 and 25 seconds, preferably the closing time being about 15 seconds or less. With the high temperatures and the high rate of closing there is little initial pre-curing of the resin and the resulting cladding or sheet material is provided with a particularly smooth and dense outer surface covering while the core with the larger particles results in a sheet material having a high void content and therefore a density less than the density of an equivalent thickness of particle board as made at present by ordinary techniques. The void content of the core is between 10% and 30% of the volume of the core and preferably about 25%.

The sheet material is allowed to cure for a sufficient period of time and is then removed from the press and the above process continued or repeated.

The board 25 is then trimmed at trimming station 26. Finally the board is stored and allowed to mature.

In this specification the word cladding is used to indicate a covering over one or each side of a wall framing e.g. stud framing whether such framing is a partition or an external building frame and is also intended to include a ceiling.

The invention also envisages an interior cladding in buildings using sheets of wall board constructed as above set forth, the joints and stopping being effected by plaster of paris joints with or without jointing tapes. To this end vertical edges of the wall board may be tapered or rebated to assist in making joints. This technique is possible because in the preferred form of the invention a lower density is achieved with more voids in the core than present similar products and dimensional stability is maintained by the particles or fibres moving in such voids.

Cladding according to the invention when covered with paint or wallpaper has a similar fire performance to wall boards at present on the market. Although plaster of paris has been mentioned above as a preferred stopping and jointing material, any suitable commercial stopping material may be used.

The above construction, at least in one or other of the described forms, has several advantages over the ordinary particle board now being manufactured.

1. It was expected that cladding manufactured according to the invention would have a rate of linear expansion due to humidity changes similar to prior art particle board i.e. about 0.34% change in length with a change in humidity from 40% to 90%. However, unexpectedly the rate of linear expansion due to humidity change is only 0.20% which is significantly lower and advantageous.

2. Because of the smooth surface achieved no sanding is necessary which has a saving in material as well as in the time and sanding equipment necessary to finish present particle board surfaces. In the manufacture of present particle boards, a slow closure during pressing results in the resin on the surface being cured or partially cured before the board densifies. This results in many of the fine particles being coated with cured resin which do not therefore bond to the other particles. As a result a dust appears on the surface and when this dust is brushed off a grainy or coarse textured surface results.

3. Furthermore the present invention in the preferred form results in less material being used, the thicker particles result in a core having greater voids than with the thinner particles used in particle boards. The bigger flakes and bigger voids results in a low density core which allows the particles or flakes to move due to moisture absorption in use and this movement results in a reduced variation in overall dimensions of a cladding material made according to the invention. This has the particular advantage that the new material is particularly stable in use such that jointing techniques such as plaster stopping may be used which would give a plain wall surface.

4. A further advantage is that a lower cost material results because of the low density of the product which means that less raw material per square meter of sheet material is necessary. This applies both to the particles and to the bonding material.

5. A still further advantage is that the fire rating is good with suitable surface coatings applied to the material.

6. We have also found that in the curing, some free formaldehyde is present in the product, and accordingly, in preparing the bonding agent, some free urea is provided, and this free urea is taken up by the free formaldehyde giving an additional bonding effect. Thus, free urea of the order of 0.3%–1.5% and preferably 0.6%–0.7% by weight of bonding urea formaldehyde is provided as 30% aqueous solution.

7. A further aspect is that because of the high pressing temperatures used some of the moisture in the cladding material is converted to steam, and this steam passes freely through the interstices between the coarse particles, particularly of the core, resulting in lower pressing times used by the invention to cause complete curing of the thickness of the material. Additionally, the high temperatures used causes some loss of moisture as steam from the in particular urea formaldehyde bonding agent, adding to the steam heat transfer aspect.

It will be seen, therefore, that the product and method provide considerable advantages over particle boards as presently constructed.

I claim:

1. A method of manufacturing cladding, said method comprising the steps of making cellulosic material in the form of particles, in which about 20% to 30% of the particles comprise fine particles the remaining percentage comprising coarse particles having a thickness of 0.35 mm to 0.7 mm, adding a bonding resin to the cellulosic material, forming the cellulosic material into a mat, passing that mat to a hot press in a manner such that said coarse particles form a core between two layers of said fine particles, operating the press in a rapid manner such that the elapsed time between the initial contacting of the press platens with the mat until the cladding material so formed is of the required thickness is between 10 seconds and 25 seconds, said pressing operation maintaining between 10% and 30% of the core void, maintaining the press temperature at temperatures of the order of 180° to 240° C., maintaining the pressure and temperature for a sufficient time to cure the cladding and removing the wall board cladding from the press.

2. A method of manufacturing cladding as claimed in claim 1 including the steps of making a mixture of said cellulosic particles but adding said bonding resin to said particles before mixing, passing the mixture past air separation means which causes the mixture to separate into a stream of coarse particles having a stream of fine particles on two sides thereof, passing a surface on which the cladding is to be formed beneath the air separating means in a manner such that one of the streams of fine particles is first collected on the surface, the stream of coarse particles is then collected and the further stream of fine particles collected resulting in said mat.

3. A method of manufacturing cladding as claimed in claim 1 wherein said void content of said core is about 25%.

4. A method of manufacturing cladding as claimed in claim 1 or claim 2 wherein said method includes the step of adding urea formaldehyde as the bonding resin.

5. A method of manufacturing cladding as claimed in claim 4 wherein about 5% by weight of bonding resin, based on the cellulosic material, is used.

6. A method of manufacturing cladding as claimed in claim 1 wherein the proportion of fine particles to coarse particles is about 25% by weight fine particles to about 75% by weight coarse particles.

7. A method of manufacturing cladding as claimed in claim 5 wherein a greater amount of bonding resin is added to the fine material.

8. A method of manufacturing cladding as claimed in claim 1 wherein the pressing temperature is about 220° C.

9. A method of manufacturing cladding as claimed in claim 8 wherein the time of closing between open and closed positions of said press is about 15 seconds.

10. A method of manufacturing cladding is claimed in claim 1 wherein fireproof coatings are applied to the cladding either during manufacture or during erection.

11. A cladding comprising cellulosic material in the form of particles of which about 20%–30% of the particles comprise fine particles and the remaining percentage comprise coarse particles having a thickness of 0.35 mm to 0.7 mm which coarse particles form a core between two layers of fine particles, said particles being bonded by bonding resin and the cladding being formed by the layers being pressed in a hot press at a temperature between 180° C. and 240° C. and the pressing pressures being arranged so that the wall board is pressed to its final thickness within 10 seconds to 25 seconds and such that said core has a void content between 10% and 30% of the volume thereof.

12. A cladding as claimed in claim 11 wherein said void content is about 25%.

13. A cladding is claimed in claim 11 wherein said wall board has a core of said particles having a thickness between 0.35 mm to 0.7 mm and said core having surface layers comprising fine particles, the proportion of fine to coarse particles being between 20% fine and 80% coarse and 30% fine and 70% coarse.

14. A cladding as claimed in claim 13 wherein said particles are 25% fine and 75% coarse.

* * * * *